United States Patent Office 3,847,832
Patented Nov. 12, 1974

3,847,832
PROCESS FOR MICROENCAPSULATING HYDROPHOBIC OIL DROPLETS AND PRODUCT OF SAID PROCESS
Hiroharu Matsukawa and Keiso Saeki, Fujinomiya, Japan, assignors to Fuji Photo Film Co., Ltd., Kanagawa, Japan
No Drawing. Filed June 1, 1971, Ser. No. 148,902
Claims priority, application Japan, June 1, 1970, 45/47,036
Int. Cl. B44d 1/44; B01j 13/02
U.S. Cl. 252—316                   7 Claims

ABSTRACT OF THE DISCLOSURE

There is provided in a process for encapsulating hydrophobic oil droplets by complex coacervation comprising the steps of providing an oil-n-water emulsion of hydrophobic oil droplets in an aqueous solution of at least 2 hydrophilic colloid materials having opposite electric charges and at least one of which is gellable, causing coacervation by diluting the emulsion with water and/or adjusting its pH, gelling the encapsulating material by cooling and prehardening the gelled material prior to hardening by adjusting the pH of the system to the alkaline side by introducing an alkali agent and a hardening agent, the improvement of adding a condensation product of naphthalenesulfonic acid and formaldehyde at a stage before said prehardening step in small amount to strengthen electrical interaction between the colloid materials of opposite electric charges and lead to the production of microcapsules having thick walls of low porosity.

---

This invention relates to a process for preparing improved microcapsules containing hydrophobic oil droplets. More specifically, the invention relates to a process for encapsulating hydrophobic oil droplets as nuclei with hydrophilic colloidal wall films by complex coacervation, wherein a condensation product of naphthalenesulfonic acid and formaldehyde is added to at least two hydrophilic colloids containing gelatin as a wall film—forming material thereby to prescribe conditions for insufficient coacervation, and the microcapsules are produced in a high concentration colloid system. The microcapsules produced by the present invention have thicker and low porous wall films.

One known method of microencapsulating a hydrophobic oily liquid utilizing complex coacervation is disclosed in U.S. Pat. 2,800,457. This method of making oil-containing microcapsules comprises (1) an emulsifying step wherein a water-immiscible oil is emulsified in a first sol of hydrophilic colloid ionizable in water, (2) a coacervation step wherein a second hydrophilic colloid sol ionizable in water and having an electric charge opposite to that of the first colloid sol is mixed with the emulsified droplets obtained in step (1) and then coacervation is caused by addition of water and/or by adjustment of the pH of the emulsion thereby to deposit the complex colloid around the individual oil droplets, (3) a gelling step wherein the coacervate is gelled by cooling, and (4) a pre-hardening step, wherein the pH is adjusted to alkali and a hardening agent is added. In the prehardening step, the alkali and hardening agent may be added reversely or simultaneously. According to this method, a hydrophobic oily liquid is covered with two colloid materials having opposite electric charges, for instance a positively charged colloid material such as gelatin, casein, albumen or fibrinogen and a negatively charged colloid material such as gum arabic, carboxymethyl cellulose or cellulose phthalate, above all gelatin and gum arabic. The microcapsules prepared by utilizing the complex coacervation of gelatin-gum arabic system are nearly ideal in limited applications.

The conditions for complex coacervation are determined by the colloid concentration, the pH of the sol mixture, the colloid ratio and the temperature. The amount of coacervate deposited becomes maximum at the optimum pH and optimum colloid ratio within a proper temperature range. Deviation from the optimum values leads progressively to insufficient coacervation conditions, and hence, a decreased amount of the coacervate deposited. With decreasing colloid concentration, the coacervation conditions approach completeness, and cause an increase in the amount of coacervate deposited. In a colloid system of high concentration, however, the coacervation conditions tend to become insufficient, and cause a reduction in the amount of coacervate deposited.

In the coacervation of two colloid materials, gelatin and gum arabic, the electrolytic strength of gum arabic to be charged negatively is smaller than that of gelatin to be charged positively, and the electric interaction between them is weak. Therefore, the amount of complex coacervate deposited is small, and the resulting microcapsules have thin walls of considerably high porosity.

Accordingly, it is an object of this invention to provide a process for economical production of hydrophobic oil-containing microcapsules having thicker and low-porous walls by complex coacervation wherein a condensation product of naphthalensulfonic acid and formaldehyde is added as a coacervate inducing agent.

The naphthalenesulfonic acid-formaldehyde condensation product used in the invention, because of its large electrolytic strength, acts as a flocculating agent to cause a flocculating reaction with gelatin, and cannot be used as a material for forming capsule walls. The use of a very small amount of this condensation product with capsule wall-forming colloids leads to the prescription of conditions for insufficient coacervation and the formation of microcapsules having thick walls of low porosity. The advantages of the present invention in which encapsulation is possible under the insufficient coacervation conditions are:

(1) Encapsulation can be effected at higher colloid concentrations. This is a great feature of the process. The output of capsules by one operation in a tank of limited capacity increases, and this contributes to a reduction in the cost of production. The resulting capsule-dispersed liquid is of high concentration, and therefore, lesser amounts of water need be evaporated in the comminution of the capsules. Thus heating energy and equipment can be saved correspondingly.

(2) Capsule walls are formed in greater quantities. This means that for a given amount of encapsulating colloid, the amount of capsules having a certain wall thickness increases. In other words, the amounts of oil droplets encapsulated increase, and the colloids can be utilized efficiently. When a material having a small electrolytic strength such as gum arabic is used, it is possible to reduce its amount drastically, and the cost of the resulting capsules can be curtailed.

(3) The temperature for inducing coacervation can be lowered. This naturally leads to a reduction in cost since less heat energy is needed.

(4) Because of greater amounts of wall films formed, the encapsulating step can be effected more easily. This is desirable in the control of the process.

The condensation of naphthalenesulfonic acid and formaldehyde used in the invention has the following structural formula

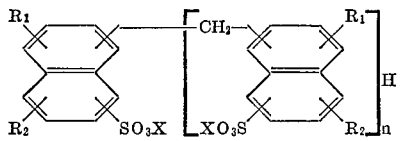

wherein $R_1$ and $R_2$ each is a hydrogen atom or an alkyl group having 1–18 carbon atoms, X is a hydrogen atom or an alkali metal, and $n$ is a degree of polymerization, preferably from 1 to 12. This condensation product may be a mixture of those having different degrees of polymerization.

The critical feature of the invention is that microcapsules having thick walls of low porosity are obtained by the known coacervation of colloid materials in the presence of a small amount of the condensation product of naphthalenesulfonic acid and formaldehyde having the aforementioned structure.

Microencapsulation of oil droplets in the present invention is attributable to complex coacervation induced by dilution with water or by pH-adjustment. Formation of complex coacervate by liquid-liquid phase separation is based on an operation of separating a mixture of at least two hydrophilic colloid sols into two liquid layers, one rich in colloid solute and the other poor in colloid solute. The complex coacervation requires at least two hydrophilic colloids as coacervating colloid which have opposite electric charges, and at least one of the colloids should be gelable.

The hydrophilic colloids include both natural and synthetic colloid materials, such as gelatin, agar-agar, casein, alginates, gum arabic, carrageenin, styrene-maleic anhydride copolymers, and ethylene-maleic anhydride copolymers. Examples of the substance which becomes the nuclei of the individual capsules are naturally occurring mineral, animal and vegetable oils. The exemplary mineral oils include petroleum and its fractions, such as kerosene, gasoline, naphtha and paraffin oil. The exemplary animal oils include fish oils and lard oils. The exemplary vegetable oils include peanut oil, linseed oil, soybean oil, castor oil and maize oil. Examples of synthetic oils are biphenyl derivatives, phosphoric acid derivatives, naphthalenic acid derivatives, phthalic acid derivatives, and salicyclic acid derivatives.

The addition of anionic, cationic or nonionic surface active agents is preferable for emulsifying oil droplets as nuclei in water since they prevent inversion, namely the formation of water-in-oil emulsion (w./o. emulsion). An oil-in-water emulsion is formed by emulsifying oil droplets as a nuclear material in an aqueous solution of at least one hydrophilic colloid which becomes capsule walls. Coacervate is deposited around the individual emulsified oil droplets by diluting the emulsion with water or adjusting its pH. The coacervate deposited on the surfaces of oil droplets after the coacervating operation is cooled from outside the tank to gel it. To harden the capsule walls, formaldehyde, for instance, is added, and the pH of the system is adjusted to render it alkaline. Hardening of the capsule walls is accelerated by heating, and results in an elevated thermal resistance of the resulting capsules.

The naphthalenesulfonic acid-formaldehyde condensate is not employed as a main wall-forming material, but is intended to increase the electrolytic strength of a colloid material to be negatively charged and to strengthen the electrical interaction between at least two colloid materials having opposite electric charges. This, in turn, helps the deposition of complex coacervate on the surfaces of oil droplets.

If the microencapsulation of hydrophobic oil droplets is performed using the aforementioned naphthalenesulfonic acid-formaldehyde condensate as a wall-forming material instead of the colloid material such as gum arabic to be charged negatively and using another colloid material to be positively charged such as gelatin, flocculation occurs in the coacervation step and normal capsules cannot be obtained since the electrolytic strength of the naphthalenesulfonic acid-formaldehyde condensate is too large. Hence, in the present invention, a very small amount of the naphthalensulfonic acid-formaldehyde condensate is used as a coacervation-inducing agent for strengthening an electrical interaction between at least two colloid materials having opposite electric charges.

The amount of the naphthalenesulfonic acid-formaldehyde condensate used in this invention is from $\frac{1}{600}$ by weight to $\frac{1}{10}$ by weight, preferably from $\frac{1}{200}$ by weight to $\frac{1}{30}$ by weight, of the total weight of the hydrophilic colloids (for instance, gelatin plus gum arabic). Amounts in excess of $\frac{1}{10}$ time cause flocculation in the coacervation step.

The coacervation inducing effect of the naphthalenesulfonic acid-formaldehyde condensate usd in the present invention will be compared with the encapsulating method disclosed in U.S. Pat. 2,800,457 (an example in which dilution with water and pH adjustment are conjointly used) with respect of the complex coacervation of a gelatin-gum arabic system. When the coacervation is effected using 12 parts by weight of colloids (6 parts by weight of gelatin and 6 parts by weight of gum arabic) and 210 parts by weight of water with the adjustment of the pH to 4.5, the amount of the complex coacervate deposited is 81% with respect to gelatin. In contrast, when the encapsulation is effected under the same conditions as set forth above except that only 0.1 part by weight (0.8 wt. percent of the total amount of the colloids of the naphthalenesulfonic acid-formaldehyde condensate as described herein above is added, the amount of the complex coacervate deposited becomes 90 wt. percent with respect to gelatin. As a more outstanding example, when the encapsulation is performed by using 6 parts by weight of gelatin, 3 parts by weight of gum arabic, and 180 parts by weight of water with the adjustment of the pH to 4.5, the effect of the naphthalenesulfonic acid-formaldehyde condensate will appear markedly as shown below.

```
                                    Amount of gelatin deposited
                                    as coacervate (wt. percent)
Method disclosed in U.S. Pat. 2,800,457 _____ 65
Process of the present invention (0.1 part, correspond-
  ing to 1.1 wt. percent of the total amount of the
  colloids ,of the naphthalenesulfonic acid-formalde-
  hyde condensate is added) _____ 81
```

It is seen from the results obtained that the amount of coacervate deposited in accordance with the complex coacervation method disclosed in U.S. Pat. 2,800,457 using 6 parts by weight of gelatin and 6 parts by weight of gum arabic is substantially the same as the amount of coacervate deposited by the process of the present invention using 6 parts by weight of gelatin and 3 parts by weight (half as much as that used in the method of the U.S. patent) of gum arabic as wall-forming materials and 0.1 part by weight of the naphthalenesulfonic acid-formaldehyde condensate. This means that the amount of gum arabic can be drastically reduced by the coacervation inducing effect of the aforementioned naphthalenesulfonic acid-formaldehyde condensation product.

By adding a very small amount of the naphthalenesulfonic acid-formaldehyde condensate to at least two colloid materials having opposite electric charges, the amounts of the colloid materials remaining in the aqueous solution decease and the amount of the colloid materials used for the deposition of coacervate increase, whereby microcapsules having thick walls of low porosity can be obtained.

The encapsulating method using coacervation has such defects as the aggregation of a plurality of the oil droplets to form a capsule, or the time-consuming hardening of capsule walls (for instance, hardening requires more than one day in the presence of a hardening agent). The process of the present invention can be more advantageously practised when combined with the process disclosed in German OLS No. 1,939,624 which has removed these defects. In other words, multinuclear capsules consisting of a plurality of particles can be made from mononuclear capsules consisting of a single particles by a short-time hardening treatment, and when the process of the invention is combined with this method of the prior application, the above-mentioned production of the multinuclear capsules has been made possible at higher colloid concentrations. This is because the pH can be changed to the alkaline side easily even under the coacervation conditions insufficient for the production of mononuclear capsules (for instance, at high colloid concentrations) by adding a shock-preventing agent in the presence of an aldehyde as a hardening agent for gelatin in the pre-hardening treatment step.

By the term "shock" used in the present specification is meant an abrupt rise in viscosity at the pH of the system being near the isoelectric point of gelatin when a coacervation microcapsular dispersion containing gelatin is subjected to the prehardening-treatment. The shock-preventing agent is a solution of a substance which prevents this shock, and includes, for instance, solutions of carboxymethyl cellulose, cellulose sulfate, pectic acid, carboxymethyl hydroxyethyl cellulose, cellulose phosphate, sodium nucleate, and carboxymethyl starch.

The process of this invention is very useful for the production of microcapsules. While especially useful application of this process is to the making of transfer sheet record material, where the oil droplets in the micro capsules contain a marking material which would be transferred to an underlying sheet by printing or marking pressures that rupture the capsules of the transfer film, it can also be used to encapsulate medicines, foods, cosmetics, poisons, adhesives or any other material which finds utility in microcapsular form. In the production of transfer sheet record material, it is expedient to encapsulate a colorless, water-insoluble leuco dye intermediate dissolved in the oil droplets. Colorless leuco dye intermediates are well known in the art, and crystal violet lactone, which is 3,3-bis-(p-dimethylaminophenyl)-6-dimethylamino phthalide, can be cited as an example. These dye intermediates are colorless in an alkaline medium and react to develop a visible color in an acidic medium. Thus, when a microcapsule containing such a compound is ruptured and the compound comes in contact with an adsorbant, acidic electron-acceptor material, such as a clay paper coated with an acid clay, a visible color appears on the adsorbant material at the point of contact.

The invention will now be described specifically by the following Examples which are presented for illustrative, rather than limitative, purposes. All "parts" appearing in the Examples are "by weight" unless otherwise specified.

In these Examples, the thermal resistance of the capsules was determined as follows: The oil droplets in the capsules had dissolved therein 2% thereof of crystal violet lactone. The resutling capsules were coated on base paper, and subjected to a heat-resistant test in a hot air drying chamber. Then, the capsule-coated surface was superposed on a clay-coated surface of a clay paper to see whether the clay-coated surface would be colored.

The clay paper was prepared in the following manner. One hundred parts of acid clay treated with sulfuric acid was dispersed in 300 parts of water containing 6 parts of a 40% aqueous solution of sodium hydroxide by means of a homogenizer. Then, 40 parts of Dow Latex 636 (tradename of the styrene-butadiene latex, produced by Dow Chemical Company, U.S.A.) was added. The resulting coating composition was applied to base paper having a unit weight of 50 g./m.² by means of a coating rod, in an amount of 12 g./m.² calculated as the solids content.

Before going into the Examples proper, several examples of synthesizing the condensation products between naphthalenesulfonic acid and formaldehyde will be described.

*Example of Synthesis 1*

Preparation of Sodium Salt of α-Naphthalenesulfonic Acid-Formaldehyde Condensate.—A three-necked flask equipped with an agitator was charged with 57 g. (0.25 mole calculated as the pure content), 7.5 g. (0.08 mole) of 95% sulfuric acid (reagent grade) and 12 g. of water. Most of the α-naphthalenesulfonic acid was dissolved at 80–85° C., and 4.3 g. of 35.8% purified formaldehyde (having a pH of 6.1 and purified with Dowex 50W×8 and Dowex 1×3) was added. While maintaining the solution at 80–85° C., 4.3 g. of formaldehyde was additionally put into the solution at the end of one hour, two hours and three hours, the total amount of the formaldehyde additionally supplied being 17.2 g. (0.21 mole). Over a period of 20 minutes after completion of the addition, the mixture was heated to a temperature of 95–100° C., and reacted for 7 and one-half hours at this temperature. The reaction product was limed by addition of calcium carbonate diluted with water, and the hot filtered. Sodium carbonate was added to the filtrate to convert it to its sodium salt. The sodium salt product was put in a cellophane, bag and dialyzed to remove free $Ca^{2+}$, $Na^+$, $SO_4^{2-}$, etc. The inorganic salts were removed to the greatest possible extent, and the insoluble precipitate was removed by filtration. Concentration and evaporation to dryness gave the final product.

*Example of Synthesis 2*

Preparation of Sodium Salt of β-Naphthalenesulfonic Acid-Formaldehyde Condensate.—The procedure set forth in Example of Synthesis 1 was repeated using β-naphthalenesulfonic acid instead of the α-naphthalenesulfonic acid.

*Examples of Synthesis 3*

Preparation of Sodium Salt of Methylnaphthalenesulfonic Acid-Formaldehyde Condensate.—The procedure set forth in Example of Synthesis 1 was repeated using methylnaphthalenesulfonic acid instead of the α-naphthalenesulfonic acid. The methylnaphthalenesulfonic acid had been obtained by methylating naphthalene, isolating and purifying methyl naphthalene, and then sulfonating the methyl naphthalene.

*Example of Synthesis 4*

Preparation of Sodium Salt of Propylnaphthalenesulfonic Acid-Formaldehyde Condensate.—Fifty (50) grams of isopropyl alcohol was mixed with 43.3 g. of naphthalene, and 91 g. of 98% sulfuric acid and 120 g. of fuming sulfuric acid were added while maintaining the temperature at 25° C. After completion of adding all of the acids, the mixture was agitated for 30 minutes, and after raising the temperature to 45–55° C., was reacted for 2 hours at this temperature. Towards the end of this period, the mixture separated into two layers. After agitating for additional 4 hours, the lower layer of acid was removed. The upper layer of sulfonic acid was diluted, neutralized, bleached, and filtered. With addition of a proper amount of Glauber's salt, the filtrate was normalized, and the solution was dried by means of a dryer. Propylnaphthalenesulfonic acid was obtained.

The procedure set forth in Example of Synthesis 1 using propylnaphthalenesulfonic acid so obtained, instead of the α-naphthalenesulfonic acid was repeated to get the desired product.

*Example of Synthesis 5*

Preparation of Sodium Salt of Butylnaphthalenesulfonic Acid-Formaldehyde Condensate.—Butylnaphthalenesulfonic acid was prepared in the same manner as set forth in the first paragraph of Example of Synthesis 4 except that anhydrous butanol was used instead of the isopropyl alcohol. The procedure set forth in Example of Synthesis 1 was repeated using butylnaphthalene-sulfonic acid so obtained.

Example 1

Six parts of acid-treated gelatin having an isoelectric point of 7.8 and 6 parts of gum arabic were dissolved in 30 parts of water at 40° C. As an emulsifying agent, 0.5 part of Turkey red oil was added. Thirty (30) parts of dichlorodiphenyl having dissolved therein 2.0% of crystal violet lactone (CVL) was emulsified in the colloid solution with vigorous stirring to form an oil-in-water emulsion. The stirring was stopped when the size of the oil droplets reached 6–10μ. To the emulsion was added 210 parts of a warm water solution at 45° C. in which 0.1 part of the sodium salt of α-naphthalenesulfonic acid-formaldehyde condensate obtained in Example of Synthesis 1 had been dissolved. With continued stirring, 50% acetic acid was added dropwise to the mixed solution to adjust its pH to 4.5. The mixture was cooled from outside the vessel after having been maintained for 15 minutes at this temperature with stirring, and the colloid walls deposited were gelled. The stirring was continued. When the temperature of the solution was 15° C., 3.0 parts of 37% formaldehyde solution was added, and when the temperature of the solution reached 17° C., 10% aqueous sodium hydroxide solution began to be added dropwise. The addition was effected over a period of one day and night with stirring to adjust the pH of the solution. The solution was heated to 50° C. over a period of 20 minutes. The capsules so obtained had a plurality of nuclei, and a size of not less than 25μ.

When the encapsulation was effected by the present Example, the amount of colloids contributing to the formation of capsule walls increased by about 10% over the method disclosed in U.S. Pat. 2,800,457 in which the naphthalenesulfonic acid-formaldehyde condensate was not employed, and the resulting microcapsules had thick walls of low porosity.

Example 2

This Example illustrates a process of encapsulation wherein the naphthalenesulfonic acid-formaldehyde condensate was used together with the anti-shock agent previously stated.

Six parts of acid-treated gelatin having an isoelectric point of 7.94 and 6 parts of gum arabic were dissolved in 30 parts of water at 40° C. As an emulsifying agent, 0.5 part of Turkey red oil was added. Thirty (30) parts of dichlorodiphenyl having dissolved therein 2.0% of crystal violet lactone was emulsified in the colloid solution with vigorous stirring to form an oil-in-water emulsion. The stirring was stopped when the size of the oil droplets reached 6–10μ. To the emulsion was added 180 parts of a warm water solution at 45° C. in which 0.1 part of the sodium salt of β-naphthalenesulfonic acid-formaldehyde condensate obtained in Example of Synthesis 2 had been dissolved. With continued stirring, 50% acetic acid was added dropwise to the mixed solution to adjust its pH to 4.5. The mixture was cooled from outside the vessel after having been maintained for 15 minutes at this temperature with stirring, thereby to gel the deposited colloid walls. The stirring was continued, and when the temperature of the solution became 15° C., 3.0 parts of 37% formaldehyde solution was added, and at the solution temperature of 10° C., 25 parts of a 5% aqueous solution of carboxymethyl cellulose (having a degree of etherification of 0.75; commercial grade being available usually as a sodium salt) was added. A 10% aqueous sodium hydroxide solution was added dropwise to the mixture over a period of 15 minutes to adjust the pH to 10.0. With stirring, the temperature of the solution was raised to 50° C. over a period of 20 minutes, and capsule-dispersed liquid of good heat resistance was obtained. Microscopic observation of the capsule liquid indicated that almost all of the capsules were mononuclear capsules containing a single emulsified droplet. The capsule liquid was coated on base paper, and subjected to a heat resistant test in a drying chamber for 3 hours at 150° C. The capsule-coated paper was superposed on the clay-coated surface of clay paper, and copying was made with a ball-point pen. A vivid colored marking was recorded on the clay paper.

With a view to illustrating that the encapsulating process according to the present Example was superior to the conventional process, the aforementioned process was repeated without using the sodium salt of β-naphthalenesulfonic acid-formaldehyde condensate. The results obtained are shown in the following table.

| | Present example | Comparative example |
|---|---|---|
| Amount of gelatin used for coacervate deposited, percent | 90 | 81 |
| Viscosity of the solution at— | | |
| 10° C., cp | 19.0 | 32.0 |
| The time of addition of alkali, cp | 32.2 | 60.0 |

It is seen from the table that according to the present invention, the amount of coacervate deposited increases, and the viscosity of the solution is drastically reduced.

In the following Examples also, the procedure was repeated without using the naphthalenesulfonic acid-formaldehyde condensate as a comparative example, and the amounts of coacervate deposited and the viscosities of the solutions were tabulated.

Example 3

The sodium salt of methylnaphthalenesulfonic acid-formaldehyde condensate obtained in Example of Synthesis 3 was added in an amount of 0.15 part to 6 parts of acid treated gelatin having an isoelectric point of 8.1 and 3 parts of gum arabic, and the mixture was added to 30 parts of water at 40° C. As an emulsifying agent, 0.5 part of Turkey red oil was added. Thirty (30) parts of dichlorodiphenyl having dissolved therein 2.0% of crystal violet lactone was emulsified in the colloid solution with vigorous stirring to form an oil-in-water emulsion. The stirring was stopped when the size of the oil droplets reached 8–10μ. One hundred and forty (140) parts of warm water at 45 °C. was added to the emulsion. With continued stirring, 50% acetic acid was added dropwise to adjust the pH of the solution to 4.5. The mixture was cooled from outside the vessel to adjust the temperature of the solution to 8° C. Thereafter, 30 parts of 37% formaldehyde was poured, and 30 parts of a 5% aqueous solution of cellulose sulfate having a degree of etherification of 0.83 was added. Over a period of 15 minutes, an aqueous 20% solution of sodium hydroxide was added dropwise to adjust the pH of the system to 10.0. The solution was heated to 50° C. to increase the heat resistance of the resulting capsules. The capsules were mononuclear, and no defect was observed in the heat resistant test.

| | Present example | Comparative example |
|---|---|---|
| Amount of gelatin used for coacervate deposited, percent | 82 | 65 |
| Viscosity of the solution at— | | |
| 10° C., cp | 16.4 | 21.7 |
| The time of changing the pH, cp | 62.4 | 230.0 |

Example 4

Six parts of acid treated gelatin having an isoelectric point of 7.98 and 6 parts of gum arabic were dissolved in 30 parts of water at 40° C. As an emulsifying agent, 0.5 part of Turkey red oil was added. Thirty (30) parts of dichlorodiphenyl having dissolved therein 2.0% of violet crystal lactone was emulsified in the colloid solution with vigorous stirring to form an oil-in-water emulsion. The stirring was stopped when the size of the oil droplets became 6–10μ. To the emulsion was added 180 parts of warm water at 45° C. With continued stirring, an aqueous 10% solution of sulfuric acid was added dropwise to adjust the pH of the emulsion to 4.3. After having been maintained for 15 minutes at this temperature with stirring, the emulsion was cooled from outside the vessel. The stirring was continued. When the temperature of the solution was 17° C., 2 parts of a 5% aqueous solution of the sodium salt of β-naphthalenesulfonic acid-formaldehyde condensate was added, and when the temperature become 15° C., 3.0 parts of 37% formaldehyde solution was added. At 10° C., 35 parts of an aqueous 5% solution of pectic acid was added. A 10% aqueous solution of sodium hydroxide was added dropwise to the mixture over a period of 15 minutes to adjust its pH to 10.0. With further stirring, the temperature of the mixed solution was raised to 50° C. There was obtained liquid having dispersed therein mononuclear capsules of good heat resistance.

Example 5

Thirty (30) parts of a mixed oil comprising chlorinated paraffin (Toyoparak A–40, tradename of the product with 40% chlorine content, Toyo Soda Kogyo Kabushiki Kaisha, Japan) and kerosene at a ratio of 4:1 and 2% of crystal violet lactone was emulsified in a colloid sol consisting of 4 parts of gum arabic, 0.1 part of the sodium salt of propylnaphthalenesulfonic acid-formaldehyde condensate obtained in Example of Synthesis 4 and 25 parts of warm water to form an oil-in-water emulsion. The stirring was stopped when the maximum size of the oil droplets became 10μ. The emulsion was added to a gelatin aqueous solution consisting of 6 parts of acid treated gelatin having an isoelectric point of 7.9 and 165 parts of warm water at 45° C. With stirring, a 5.0% aqueous solution of succinic acid was added to adjust the pH of the mixture to 4.2. With continued slow stirring, the coacervate walls were set to a gel by cooling from around the vessel. When the temperature was 10° C., 3.0 parts of 30% glutaraldehyde was added, and then 30 parts of a 5% aqueous solution of carboxymethyl hydroxyethyl cellulose having an etherification degree of 0.8 was additionally supplied. A 20% aqueous solution of potassium hydroxide was added dropwise over a period of 10 minutes to adjust the pH of the system to 10.0. The capsule-dispersed liquid was heated to 50° C. to get hardened capsules.

|  | Present example | Comparative example |
| --- | --- | --- |
| Amount of gelatin used for coacervate deposited, percent | 84 | 72 |
| Viscosity of the solution at— |  |  |
| 10° C., cp | 17.2 | 28.4 |
| The time of adding alkali, cp | 46.3 | 155.0 |

Example 6

The procedure set forth in Example 3 was repeated except that the sodium salt of butylnaphthalenesulfonic acid-formaldehyde condensate obtained in Example of Synthesis 5 was used instead of the sodium salt of methylnaphthalenesulfonic acid-formaldehyde condensate, and 30 parts of a 5% aqueous solution of cellulose phosphate having a degree of etherification of 0.85 was added as the anti-shock agent. The capsules obtained were mononuclear.

Example 7

The procedure set forth in Example 5 was repeated using dioctyl phthalate instead of the chlorinated paraffin, 175 parts, instead of 165 parts, of the gelatin solution, and an aqueous 10% solution of hydrochloric acid instead of the aqueous 5.0% solution of succinic acid. To gel the resulting coacervate walls encapsulating dioctyl phthalate, they were cooled from around the vessel. When the temperature was 15° C., 25 parts of 30% glyoxal was poured, and when the temperature became 10° C., 30 parts of an aqueous 20% solution of carboxymethyl starch (made from maize and having a degree of etherification of 0.75) was added. Over a period of 15 minutes, a 20% aqueous solution of sodium hydroxide was added dropwise to adjust the pH of the system to 10.0. The solution was heated up to 50° C. to increase the heat resistance of the capsules.

Example 8

The same procedure as set forth in Example 3 was repeated except that 135 parts of water was used for dilution, the pH was adjusted to 4.2, and 40 parts of an aqueous 5% solution of sodium nucleate was used as the anti-shock agent. The resulting capsules were mononuclear, and withstood the heat resistant test.

What we claim is:

1. In a process of microencapsulating hydrophobic oil droplets by complex coacervation comprising the steps of providing an oil-in-water emulsion of hydrophobic oil droplets an aqueous solution of at least two hydrophilic colloid materials having opposite electric charges, at least one of the colloids being gellable, causing coacervation of the colloid materials by diluting the emulsion with water and/or adjusting its pH, gelling the encapsulating complex colloid material by cooling and prehardening the gelled material prior to hardening by adjusting the pH of the system to the alkali side by introducing therein an alkali agent and a hardening agent, the improvement which comprises adding a condensation product of a naphthalenesulfonic acid and formaldehyde to said hydrophilic colloid materials at a stage before said prehardening step, said condensation product of said naphthalenesulfonic acid and formaldehyde having the following structural formula:

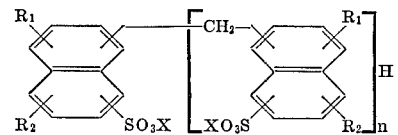

wherein $R_1$ and $R_2$ each represent a member selected from the group consisting of a hydrogen atom and an alkyl group having from 1 to 18 carbon atoms; X represents a member selected from the group consisting of a hydrogen atom and an alkali metal; and $n$ represents a degree of polymerization ranging from 1 to 12, said condensation product being employed in an amount between $\frac{1}{200}$ and $\frac{1}{30}$ of the total amount of said hydrophilic colloid materials.

2. The process as claimed in claim 1 wherein said condensation product is a condensate of formaldehyde and a naphthalenesulfonic acid selected from the group consisting of α-naphthalenesulfonic acid, β-naphthalenesulfonic acid, methylnaphthalenesulfonic acid, propylnaphthalenesulfonic acid, butylnaphthalenesulfonic acid and a salt thereof.

3. The process as claimed in claim 1 wherein said colloid materials used are gelatin and gum arabic.

4. The process as claimed in claim 1 wherein a shock-preventing agent is added during the prehardening step, in an amount sufficient to prevent an abrupt rise in viscosity when the pH of the system is near the isoelectric point of gelatin,
said shock-preventing agent being a member selected from the group consisting of carboxymethyl cellulose, cellulose sulfate, pectic acid, carboxmethyl hyhydroxyethyl cellulose, cellulose phosphate, sodium nucleate, and carboxymethyl starch.

5. Pressure-rupturable microcapsules produced according to the process of claim 1.

6. The process of claim 1, wherein said colloidal material is a member selected from the group consisting of gelatin, agar-agar, casein, alginates, gum arabic, carrageenin, styrene-maleic anhydride copolymers, and ethylene-maleic anhydride copolymers.

7. The process of claim 1, wherein said hydrophobic oil is a member selected from the group consisting of kerosene, gasoline, naphtha, paraffin oil, fish oil, lard oil, peanut oil, linseed oil, soybean oil, castor oil, maize oil, biphenyl derivatives, phosphoric acid derivatives, naphthalenic acid derivatives, phthalic derivatives, and salicylic acid derivatives.

References Cited

UNITED STATES PATENTS

| | | | |
|---|---|---|---|
| 3,687,865 | 8/1972 | Katakama et al. | 252—316 |
| 2,800,457 | 7/1957 | Green et al. | 252—316 |
| 2,969,331 | 1/1961 | Brynko et al. | 252—316 |
| 3,265,629 | 8/1966 | Jensen | 252—316 |
| 3,494,872 | 2/1970 | Maierson et al. | 252—316 |

FOREIGN PATENTS

| | | | |
|---|---|---|---|
| 2,027,819 | 12/1970 | Germany | 252—316 |

RICHARD D. LOVERING, Primary Examiner

U.S. Cl. X.R.

117—36.1, 36.2, 62.2, 100A; 264—4; 424—34, 37